Sept. 27, 1932.  R. W. SCHLUMPF  1,879,127

COMBINATION ROLLING AND SCRAPING CUTTER BIT

Filed July 21, 1930

R. W. Schlumpf  Inventor

By Jesse R. Stone

Attorney

Patented Sept. 27, 1932

1,879,127

UNITED STATES PATENT OFFICE

ROBERT W. SCHLUMPF, OF HOUSTON, TEXAS, ASSIGNOR TO HUGHES TOOL COMPANY, OF HOUSTON, TEXAS, A CORPORATION OF TEXAS

COMBINATION ROLLING AND SCRAPING CUTTER BIT

Application filed July 21, 1930. Serial No. 469,301.

My invention relates to earth boring drills to be employed in deep well drilling for oil, gas, sulphur, and the like.

In drilling deep wells, it is found in some localities that the formation through which the drill is advancing is composed of varying materials, some of which are soft and plastic, and others hard and brittle. It is difficult with the roller drill to provide a cutter which will cut all kinds of formations, and thus enable the driller to continue drilling with the same drill through all the formations which he encounters.

It is an object of my invention to provide a drill having cutters thereon, arranged and formed to drill through all types of formations.

I desire to provide both rolling and scraping cutters upon the same drill, so arranged that the scraping cutter will cut off the material loosened from the bottom of the hole by the rolling cutter.

As a further object I provide a drill in which the cutters may be readily assembled thereon without difficulty.

In the drawing herewith I have shown in Fig. 1 a side elevation of a drill embodying my invention.

Figure 1:
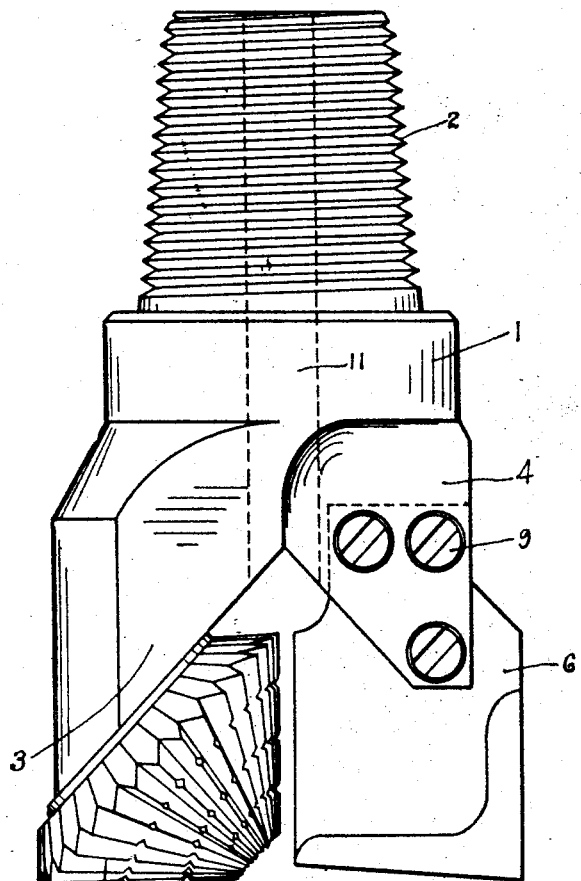
Figure 2:
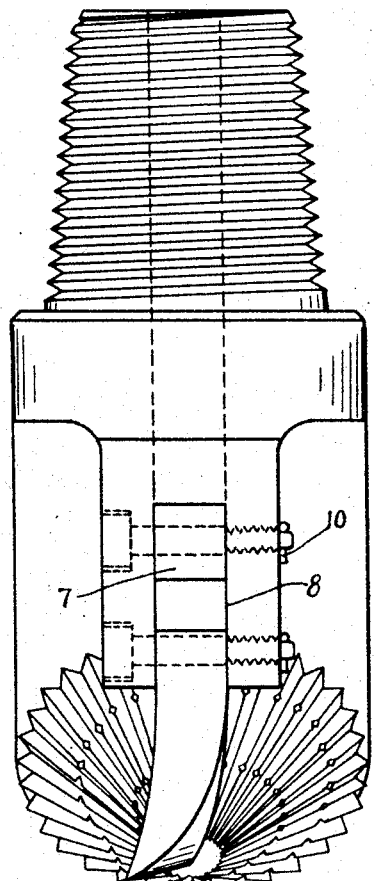
Fig. 2 is a side view taken at right angles to the view shown in Fig. 1.

My drill comprises a head 1 of approximately cylindrical shape at its upper end and provided with a threaded shank 2 for engagement with the drill collar or tool joint. Below the cylindrical portion 1, the head is flattened somewhat and is provided with two diverging arms 3 and 4. The arm 3 being shaped to receive the rolling cutter 5, and the arm 4 to receive the scraping cutter 6. The rolling cutter 5 is of ordinary construction now common in the art. It is approximately frusto-conical in shape, and is mounted in an inclined position so that it will have an approximately true rolling motion as it rolls upon the bottom of the hole.

The scraping cutter is mounted opposite the rolling cutter 5. The scraping cutter 6 comprises a blade, the flattened upper end 7 of which fits within a slot or recess 8 formed longitudinally of the arm 4. The blade is held in position in the recess 8 by transverse bolts or screws 9 extended through said arm and said blade, and held against unscrewing by cotter pins 10 thereon. The blade 6 is curved forwardly in the direction of rotation at its outer end and is tapered to a cutting edge 12.

Figure 3:
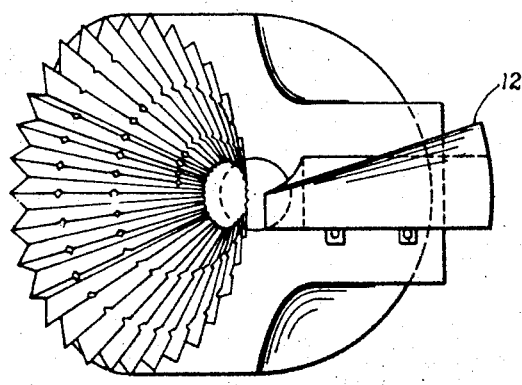
Fig. 3 is a bottom plan view of the drill.

As seen from Fig. 3, it will be understood that the blade is curved forwardly to a greater extent adjacent its outer edge, and is thus adapted to move the material adjacent the outer wall of the hole toward the middle of the hole where it can be more readily washed away.

There is a central longitudinal water channel shown at 11 in the drawing. This channel conducts water axially of the head and discharges it upon the two cutting elements thus described.

In the use of my improved drill, it is found that even in the hard formation, the rolling cutter 5 will penetrate into the formation, leaving a corrugated bottom to the hole. The scraping cutter will engage upon the crests of the corrugations formed by the rolling cutter and tend to remove them, so that they may be carried away with the flushing fluid. This is particularly true in case of plastic or soft formations into which the teeth of the rolling cutter may penetrate deeply but in which the material is not chipped or disintegrated upon the bottom of the hole.

The arrangement of the two cutters in opposite relation as shown produces a particularly effective and well balanced drill in which the two cutters cooperate to remove the material from the well bottom without difficulty.

The advantages of this structure will be apparent without further description.

What I claim as new is:

1. An earth boring drill including a head, a pair of downwardly projecting arms thereon, an approximately frusto-conical rolling cutter mounted upon one of said arms, and a flattened scraping blade secured upon the other of said arms.

2. An earth boring drill including a head, a pair of downwardly projecting arms thereon, an approximately frusto-conical rolling cutter mounted upon one of said arms, and a flattened scraping blade secured upon the other of said arms, said cutters being arranged in balanced position opposite each other at the forward end of said head.

3. An earth boring drill including a head, a downwardly and outwardly inclined arm at the forward end thereof, a frusto-conical shaped cutter mounted thereon to engage the bottom of the hole with an approximately true rolling action, and a scraping blade positioned opposite said rolling cutter and adapted to cut the material engaged by said rolling cutter.

4. An earth boring drill including a head, a downwardly and outwardly inclined arm at the forward end thereof, a frusto-conical shaped cutter mounted thereon to engage the bottom of the hole with an approximately true rolling action, a flattened forwardly extending arm opposite said cutter, and a blade secured detachably in said arm, said blade being rigidly positioned slightly above said rolling cutter to cut the material loosened by said rolling cutter.

In testimony whereof, I hereunto affix my signature, this the 16 day of July A. D., 1930.

ROBERT W. SCHLUMPF.